(12) United States Patent
Chen et al.

(10) Patent No.: US 10,296,681 B2
(45) Date of Patent: *May 21, 2019

(54) PROCESS BASED METROLOGY TARGET DESIGN

(71) Applicant: ASML NETHERLANDS B.V., Veldhoven (NL)

(72) Inventors: Guangqing Chen, Fremont, CA (US); Shufeng Bai, San Carlos, CA (US); Eric Richard Kent, San Jose, CA (US); Yen-Wen Lu, Saratoga, CA (US); Paul Anthony Tuffy, Los Gatos, CA (US); Jen-Shiang Wang, Sunnyvale, CA (US); Youping Zhang, Fremont, CA (US); Gertjan Zwartjes, 's-Hertogenbosch (NL); Jan Wouter Bijlsma, Eindhoven (NL)

(73) Assignee: ASML Netherlands B.V., Veldhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 15/982,933

(22) Filed: May 17, 2018

(65) Prior Publication Data

US 2018/0268093 A1 Sep. 20, 2018

Related U.S. Application Data

(63) Continuation of application No. 14/941,347, filed on Nov. 13, 2015, now Pat. No. 10,007,744.

(Continued)

(51) Int. Cl.
*G06F 17/50* (2006.01)
*G03F 7/00* (2006.01)
(Continued)

(52) U.S. Cl.
CPC .......... *G06F 17/5009* (2013.01); *G03F 7/705* (2013.01); *G03F 7/70633* (2013.01);
(Continued)

(58) Field of Classification Search
CPC ............. G06F 17/5009; G06F 2217/12; G06F 2217/14; G03F 7/705; G03F 7/70633; G03F 7/0683
(Continued)

(56) References Cited

U.S. PATENT DOCUMENTS 6,587,744 B1 7/2003 Stoddard et al.
7,695,876 B2 4/2010 Ye et al.
(Continued)

FOREIGN PATENT DOCUMENTS

TW 200408792 6/2004
TW 200421056 10/2004
WO 2014/138057 9/2014

OTHER PUBLICATIONS

Taiwan Office Action dated Mar. 6, 2017 in corresponding Taiwan Patent Application No. 104137059.
(Continued)

*Primary Examiner* — Phallaka Kik
(74) *Attorney, Agent, or Firm* — Pillsbury Winthrop Shaw Pittman LLP

(57) ABSTRACT

Methods and systems for automatically generating robust metrology targets which can accommodate a variety of lithography processes and process perturbations. Individual steps of an overall lithography process are modeled into a single process sequence to simulate the physical substrate processing. That process sequence drives the creation of a three-dimensional device geometry as a whole, rather than "building" the device geometry element-by-element.

23 Claims, 14 Drawing Sheets

Related U.S. Application Data

(60) Provisional application No. 62/080,792, filed on Nov. 17, 2014.

(51) Int. Cl.
  *G03F 7/20* (2006.01)
  *G06F 17/12* (2006.01)
  *G06F 17/14* (2006.01)

(52) U.S. Cl.
  CPC .......... *G03F 7/70683* (2013.01); *G06F 17/12* (2013.01); *G06F 17/14* (2013.01); *G06F 2217/12* (2013.01); *G06F 2217/14* (2013.01)

(58) Field of Classification Search
  USPC ................................. 716/55, 51; 703/1, 2, 14
  See application file for complete search history.

(56) References Cited

U.S. PATENT DOCUMENTS

| | | |
|---|---|---|
| 7,873,504 B1 | 1/2011 | Bevis |
| 7,925,486 B2 | 4/2011 | Smith et al. |
| 9,015,016 B2 | 4/2015 | Lorenz et al. |
| 9,330,985 B2 | 5/2016 | Vaid et al. |
| 9,733,576 B2 | 8/2017 | Smith et al. |
| 9,846,132 B2 | 12/2017 | Bakeman et al. |
| 10,007,744 B2 * | 6/2018 | Chen .................. G03F 7/70683 |
| 2003/0158710 A1 | 8/2003 | Bowley et al. |
| 2004/0181768 A1 | 9/2004 | Krukar |
| 2006/0015206 A1 | 1/2006 | Funk et al. |
| 2007/0050749 A1 | 3/2007 | Ye et al. |
| 2007/0276634 A1 | 11/2007 | Smith et al. |
| 2008/0140590 A1 | 6/2008 | Shen |
| 2008/0273662 A1 | 11/2008 | Yun et al. |
| 2009/0144042 A1 | 6/2009 | Lorenz et al. |
| 2010/0143832 A1 | 6/2010 | Houben |
| 2010/0312374 A1 | 12/2010 | Tsai et al. |
| 2011/0078638 A1 | 3/2011 | Kahng et al. |
| 2014/0031969 A1 | 1/2014 | Baseman et al. |
| 2015/0185625 A1 | 7/2015 | Chen et al. |
| 2015/0186582 A1 | 7/2015 | Chen et al. |
| 2015/0261896 A1 | 9/2015 | Smith et al. |
| 2016/0003609 A1 | 1/2016 | Shchegrov et al. |
| 2016/0349627 A1 | 12/2016 | Van Der Schaar et al. |
| 2017/0060001 A1 | 3/2017 | Adel et al. |
| 2018/0032662 A1 * | 2/2018 | Adel .......................... G03F 1/36 |

OTHER PUBLICATIONS

International Search Report dated Feb. 12, 2016 in corresponding International Patent Application No. PCT/ EP2015/074450.

Kai-Hsiung Chen et al., "Improving on-product performance at lithe using integrated diffraction-based metrology and computationally designed device-like targets fit for advanced technologies (incl. FinFET)," Proc. of SPIE, vol. 9050, pp. 90500S-1-90500S-10 (Apr. 2, 2014).

International Technology Roadmap for Semiconductors, 2009 Edition, 2009, Metrology, https://www.semiconductors.org/clientuploads/Research_Technology/ITRS/2009/Metrology.pdf, 39 pages.

Lucas, Kevin et al., "Efficient and rigorous three-dimensional model for optical lithography simulation", vol. 13, No. 11, Journal of the Optical Society of America A-optics Image Science and Vision, pp. 2187-2199 (1996).

* cited by examiner

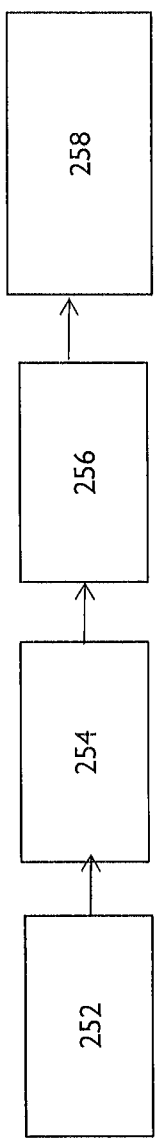

| Device Layer | Step | Process |
|---|---|---|
| Device2 | 13 | Planar deposit SIN 90.0 FROM_TOP_MOST |
| | 12 | |
| | 11 | Etch 180.0 90.0 SIN,Si_JAW,bl |
| | 10 | Pattern model=/h/tachyo.../defaultModel/geomModel |
| Device1 | 9 | Planar deposit pr 90.0 FROM_TOP_MOST |
| | 8 | Planar deposit bl 200.0 FROM_TOP_MOST |
| | 7 | Planar deposit ml 0.0 FROM_TOP_MOST |
| | 6 | Strip pr |
| | 5 | Etch 100.0 SIN |
| | 4 | Pattern model=/h/tachyo.../defaultModel/geomModel |
| | 3 | Planar deposit pr 100.0 FROM_TOP_MOST |
| | 2 | Planar deposit SIN 90.0 FROM_BOTTOM_MOST |
| Substrate | 1 | Substrate Si_JAW |

Planar deposit ml 0.0 FROM_TOP_MOST

PROCESS BASED METROLOGY TARGET DESIGN

This application is a continuation of U.S. patent application Ser. No. 14/941,347, filed Nov. 13, 2015, now U.S. Pat. No. 10,007,744, which claims the benefit of priority of U.S. provisional patent application no. 62/080,792, filed Nov. 17, 2014, each of which is incorporated herein in its entirety by reference.

TECHNICAL FIELD

The description herein relates to simulation of performance of lithographic apparatuses used for lithographic processes, and more particularly to computer-aided design of substrate metrology targets taking into account the actual lithography process to be used.

BACKGROUND

A lithographic apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic apparatus, one target portion at a time. In one type of lithographic apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic apparatus will have a magnification factor M (generally <1), the speed F at which the substrate is moved will be a factor M times that at which the projection beam scans the patterning device.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemical-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

In lithographic processes, it is desirable to frequently make measurements of structures created for process control and verification. One or more parameters of the structures are typically measured or determined, for example, the overlay error between successive layers formed in or on the substrate. However, target selection by frequent measurement is labor-intensive and time-consuming. Therefore, it makes sense to implement a computer-aided design (CAD) system that is capable of automatically generating designs of metrology targets in the simulation domain without the need for actual frequent measurement.

Currently, metrology target designers measure dimensions of patterns formed on a resist layer, and feed that data to a computerized lithography process model to predict the device structure that will be printed on the actual substrate. However, as lithography processes get more complex, the device structure formed on the substrate after processing tend to become significantly different from the patterns formed in the resist. Examples of complex lithography processes include spacer-based double lithography process, FinFET processes etc. Because of the process-induced complexities, it is becoming difficult for metrology target designers to render the correct target structure from measured or modeled resist patterns.

Additionally, some substrate structures (e.g., odd number of fins in a FinFET) are not compatible with the lithography process, but a designer could manually add those problematic structures by mistake. Those structures cannot be generated properly via a CAD tool. Also, without the CAD tool, targets of different designs for every layer or layer pairs have to be drawn one at a time. With the large number of lithography layers and different design options, the manual drawing of all possible targets become unmanageable. Therefore, not only automatic generation of metrology target design is important, but proper organization and easy retrieval of the auto-generated designs are equally important.

Further, it is beneficial to alter target dimensions to test the design robustness with respect to process perturbations. Currently, the dimensional alterations are purely geometrical and may not be process compatible. For example in a FinFET process, some of the fin side wall angles are related and should be altered together. But the current methods cannot handle this special requirement. Therefore, it is desirable to have the capability to design multiple metrology targets in a flexible and time-and-resource-efficient manner in the simulation domain from which a lithographer may select the targets that are optimal for a selected process.

SUMMARY

The present disclosure teaches methods and systems for automatically generating robust metrology targets which can accommodate a variety of lithography processes and process perturbations. The overarching methodology is referred to as "Design for Control", abbreviated as D4C. In a D4C method, individual steps of a lithography process are modeled into a single process sequence to simulate the physical substrate processing. That process sequence drives the creation of the device geometry as a whole, rather than "building" the device geometry element-by-element. This is different from conventional approaches that use purely graphical volume elements in a three-dimensional schematic editor to build metrology targets.

As the present disclosure elaborates, a target designer enters design parameters necessary to simulate a physical substrate processing, based on the modeled process sequence. A visualization tool renders substrate structures in real time during the steps of the processing. Various capabilities of the visualization (such as, coloring, rotation, slicing, transparency, zooming, etc.) are provided for facilitating the design process and/or enhancing the designer's or a user's comprehension. For different target patterns in photoresist, the substrate structures are automatically generated, from which suitable metrology targets can be selected. Also, metrology targets are automatically generated after process parameters are perturbed. The target designs that are most robust against the process perturbations are selected after the overall lithography process simulation. Specifically, the disclosure describes a computer-implemented method of automatically designing a plurality of metrology targets in a simulation domain, the metrology targets compatible to a lithography process used to fabricate a semiconductor device, the method comprising: providing design parameters for generating the plurality of metrology targets; designing three-dimensional geometrical structures of the plurality of metrology targets based on a model of the lithography process and the design parameters for the plurality of the metrology targets, wherein the model of the lithography process comprises a sequence of process steps; and, visual rendering in real-time a gradual formation of a design of the three-dimensional geometric structure of the plurality of metrology targets in the simulation domain. The disclosure further describes providing a user various tools for visualization of the rendered device structure, the tools including coloring, shading, rotating, slicing, transparency, zooming in, zooming out etc., so that the user has enhanced perception of how the substrate structure changes as each process step is applied.

BRIEF DESCRIPTION OF THE DRAWINGS

The above aspects and other aspects and features will become apparent to those ordinarily skilled in the art upon review of the following description of specific embodiments in conjunction with the accompanying figures, wherein:

FIG. 2C shows a flow chart showing how the 'design for control' process chooses metrology target designs robust against process perturbations, according to an embodiment;

FIG. 5 shows an illustrative graphic user interface for process definition, according to an embodiment;

DETAILED DESCRIPTION

Figure 1:
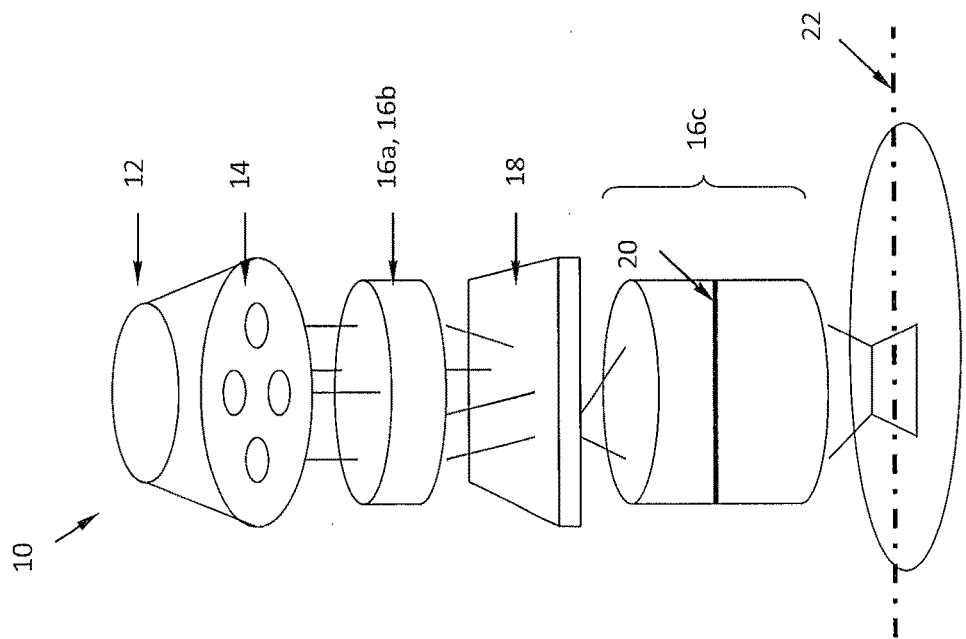
FIG. 1 is a block diagram of various subsystems of a lithography system according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic apparatuses that project a design layout onto a substrate using illumination from a deep-ultraviolet (e.g., 13.52 nm) illumination source or an extreme-ultraviolet illumination source, creating individual functional elements having dimensions well below 30 nm.

This process in which features with dimensions smaller than the classical resolution limit of a lithographic apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic apparatus, CD is the "critical dimension"—generally the smallest feature size printed—and $k_1$ is an empirical resolution factor.

It is noted that the terms "mask", "reticle", "patterning device" are utilized interchangeably herein. Also, person skilled in the art will recognize that, especially in the context of lithography simulation/optimization, the term "mask,"

"patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

Although specific reference may be made in this text to the use of the embodiments in the manufacture of ICs, it should be explicitly understood that the embodiments has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle," "wafer" or "die" in this text should be considered as interchangeable with the more general terms "mask," "substrate" and "target portion," respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The patterning device referred to above encompasses physical reticles or computer-generated design layouts. The design layouts can be generated utilizing CAD (computer-aided design) programs. This process often being referred to as EDA (electronic design automation). Most CAD programs follow a set of design rules in order to create functional design layouts. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. One of the goals in integrated circuit fabrication is to faithfully reproduce the original circuit design on the substrate (via the patterning device).

The Design for Control (D4C) methodology disclosed herein is an advanced CAD tool for automated generation of metrology targets. An arbitrary number of metrology targets can be designed in an efficient manner (i.e. with zero or minimal manual intervention), once the lithography process sequence is modeled and added as an input. The number of metrology targets can be in the thousands or even in the millions. The lithography process model takes into account characteristics of a lithography apparatus.

As a brief introduction, FIG. 1A illustrates a generic lithographic apparatus whose characteristics are incorporated into a process model of the present disclosure. Major components are an illumination source 12, which may be a deep-ultraviolet excimer laser source or other type of sources including extreme ultra violet (EUV) sources, illumination optics which define the partial coherence (denoted as sigma) and which may include optics 14, 16a and 16b that shape radiation from the source 12; a patterning device (e.g., a mask or reticle) 18; and transmission optics 16c that project an image of the patterning device pattern onto a substrate plane 22. An adjustable filter or aperture 20 at the pupil plane of the projection optics may restrict the range of beam angles that impinge on the substrate plane 22, where the largest possible angle defines the numerical aperture of the projection optics $NA=\sin(\Theta_{max})$. The term "source" and "illumination source" as used herein may include illumination optics.

In a lithographic apparatus, a source provides illumination (i.e. radiation); projection optics direct and shapes the illumination via a patterning device and onto a substrate. The term "projection optics" is broadly defined here to include any optical component that may alter the wavefront of the radiation beam. For example, projection optics may include at least some of the components 14, 16a, 16b and 16c. An aerial image (AI) is the radiation intensity distribution on the substrate. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image. The resist model is related only to properties of the resist layer (e.g., effects of chemical processes which occur during exposure, PEB and development). Optical properties of the lithographic apparatus (e.g., properties of the source, the patterning device and the projection optics) dictate the aerial image. Since the patterning device used in the lithographic apparatus can be changed, it is desirable to separate the optical properties of the patterning device from the optical properties of the rest of the lithographic apparatus including at least the source and the projection optics.

The D4C software program disclosed herein is built on an existing computational lithography (CL) platform. Non-limiting example of such a platform is ASML's Tachyon™ platform. D4C can run in conjunction with particular applications on the CL platform, such as Source-Mask Optimization (SMO) application, Focus-Exposure Modeling (FEM) application, Lithography Manufacturability Check (LMC) application, etc. The user should be able to perform all required steps to design metrology targets without intervention from the creator of the D4C program. Appropriate graphic user interfaces (GUI) are made available to set up, execute, review and use the features of the D4C program. The main users of the program are likely to be metrology or lithography engineers. Usually, no special interface with the fabrication tools is needed, because the metrology target design is mostly confined in the simulation domain rather than in the actual device manufacturing domain.

Conventional target design tools, such as multi-physics 3-D modeling software, usually "draw" or "build" a geometric structure using area or volume elements which are purely graphical. Those graphical elements are assigned multi-physics parametric characteristics. An example of such an approach can be found in U.S. publication no. 2009/0144042, entitled, "System and Method for Three-Dimensional Schematic Capture and Result Visualization of Multi-Physics System Models," by Lorenz et al. The fundamental difference of the D4C method with the conventional method is that the lithography process itself drives the rendering of the 3D structure of the metrology targets, so the designers do not have to build the model element-by-element. Some of the advantages of the D4C methodology over the current methodologies are:

D4C is faster: Multiple targets from the same process are generated automatically. The number of targets may be in the range of millions or even more, if desired.

D4C is accurate: The D4C process eliminates manual drawing errors. Generated targets are lithography process compatible, and target creation steps are traceable, so that particular process-induced errors can be easily tracked and corrected.

Data reduction and organization: All data representing designed metrology targets of the same process are organized in one place, and multiple (could be millions or more) targets are tracked by parameters with which they are generated instead of having to track individual drawings.

Other existing rule-based target design methods may offer some of the functionalities of the D4C method. For example, a per-layer-pair profile template approach can generate multiple targets of different designs as long as the targets are for the same layer. However the D4C method is more versatile and more intuitive for the target designers, lithographers and device manufacturers, since it is based on an actual process sequence rather than based on rules. D4C method is capable of designing metrology targets for multiple layers based on the overall process sequence rather than a per-layer-based process model.

Figure 2A:
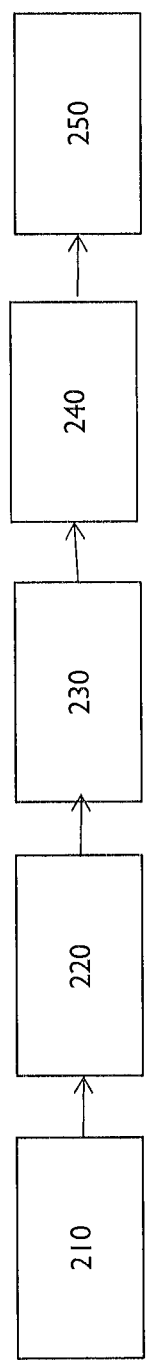
FIG. 2A shows a flow chart showing various stages of a 'design for control' process flow, according to an embodiment.

FIG. 2A shows a flowchart that lists the main stages of the D4C method. In stage 210, the materials to be used in the lithography process are selected. The materials may be selected from a materials library interfaced with D4C through appropriate GUI. In stage 220, a lithography process is defined by entering each of the process steps, and building a computer simulation model for the entire process sequence. In stage 230, a metrology target is defined, i.e. dimensions and other characteristics of various features included in the target are entered into the D4C program. For example, if a grating is included in a structure, then number of grating elements, width of individual grating elements, spacing between two grating elements etc, have to be defined. In stage 240, the 3D geometry is created. This step also takes into account if there is any information relevant to a multi-layer target design, for example, the relative shifts between different layers. This feature enables multi-layer target design. In stage 250, the final geometry of the designed target is visualized. As will be explained in greater detail below, not only the final design is visualized, but as the designer applies various steps of the lithography process, he/she can visualize how the 3D geometry is being formed and changed because of process-induced effects. For example, the 3D geometry after resist patterning is different from the 3D geometry after resist removal and etching.

Figure 2B:
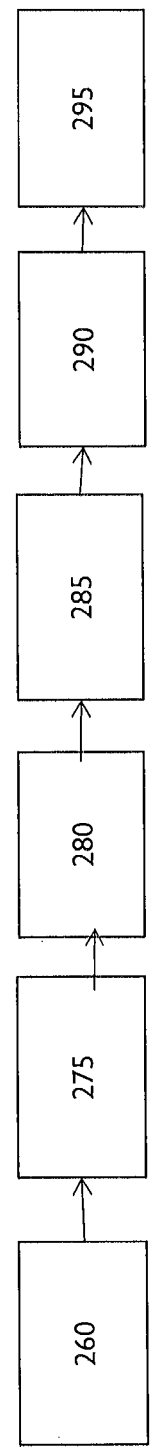
FIG. 2B shows a block diagram showing various stages for visualization, according to an embodiment.

An important aspect of the present disclosure is that the target designer is enabled to visualize the stages of the method to facilitate their perception and control during modeling and simulation. Different visualization tools, referred to as "viewers," are built into the D4C software. For example, as shown in FIG. 2B, a designer can view material plots 260 (and may also get a run time estimation plot) depending on the defined lithography process and target. Once the lithography model is created, the designer can view the model parameters through model viewer tool 275. Design layout viewer tool 280 may be used to view the design layout (e.g., visual rendering of the GDS file). Resist profile viewer tool 285 may be used to view pattern profiles in a resist. Geometry viewer tool 290 may be used to view 3D structures on a substrate. A pupil viewer tool 295 may be used to view simulated response on a metrology tool. Persons skilled in the art would understand that these viewing tools are available to enhance the understanding of the designer during design and simulation. One or more of these tools may not be present in some embodiments of D4C software, and additional viewing tools may be there in some other embodiments.

FIG. 2C shows a flow chart that illustrates how the D4C process increases efficiency in the overall simulation process by reducing the number of metrology targets selected for the actual simulation of the lithography process. As mentioned before, D4C enables designers to design thousands or even millions of designs. Not all of these designs may be robust against variations in the process steps. To select a subset of target designs that can withstand process variation, a lithographer may intentionally perturb one or more steps of the defined lithography process, as shown in block 252. The introduction of the perturbation alters the entire process sequence with respect to how it was originally defined. Therefore, applying the perturbed process sequence (block 254) alters the 3D geometry of the designed target too. A lithographer only selects the perturbations that show non-zero alternations in the original design targets and creates a subset of selected process perturbations (block 256). The lithography process is then simulated with this subset of process perturbations (block 258).

Figure 3:
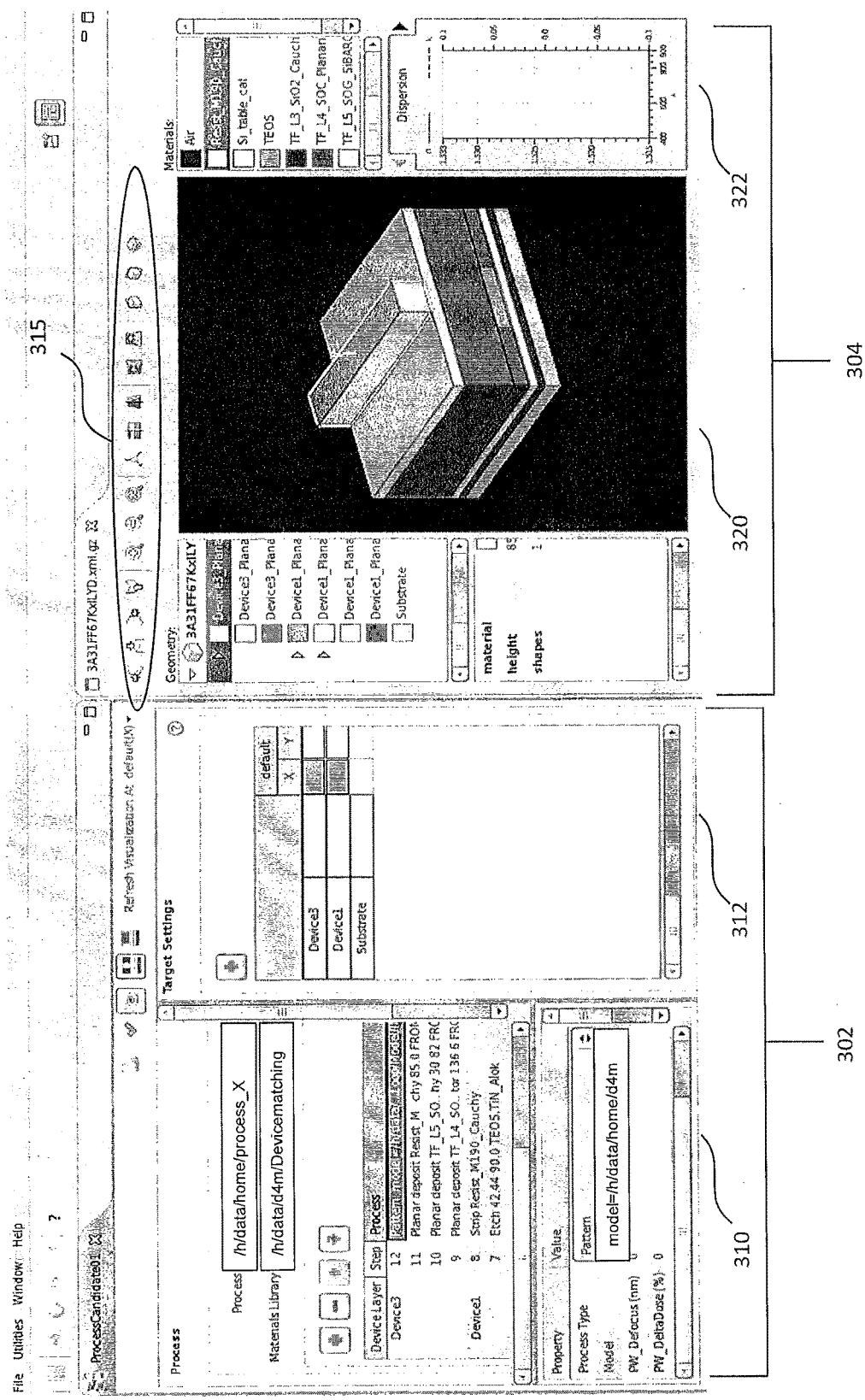
FIG. 3 shows an illustrative screenshot of the visual environment of the present disclosure.

FIG. 3 shows a screenshot to convey the idea of how the D4C facilitates a use (i.e. a target designer/lithographer) by laying out multiple displays according to user's preference. On a high level, the area 302 displays various information related to the process steps and the design parameters, and the area 304 displays the 3D geometry of the metrology target, as it is being built in a process-driven way. Specifically, the area 310 displays details of the process steps (such as, deposition, resist coating, planarization etc.) as defined, and the area 312 displays individual device layer information for a multi-layer semiconductor device. Area 304 includes view control menu (rotation, zoom, transparency, coloring etc.) in area 315 to manipulate the 3D structure in area 320. In addition to the geometry of the structure, charts and graphs (such as 322) showing material plots and/or simulation results can also be displayed on the user's screen.

Figure 4:
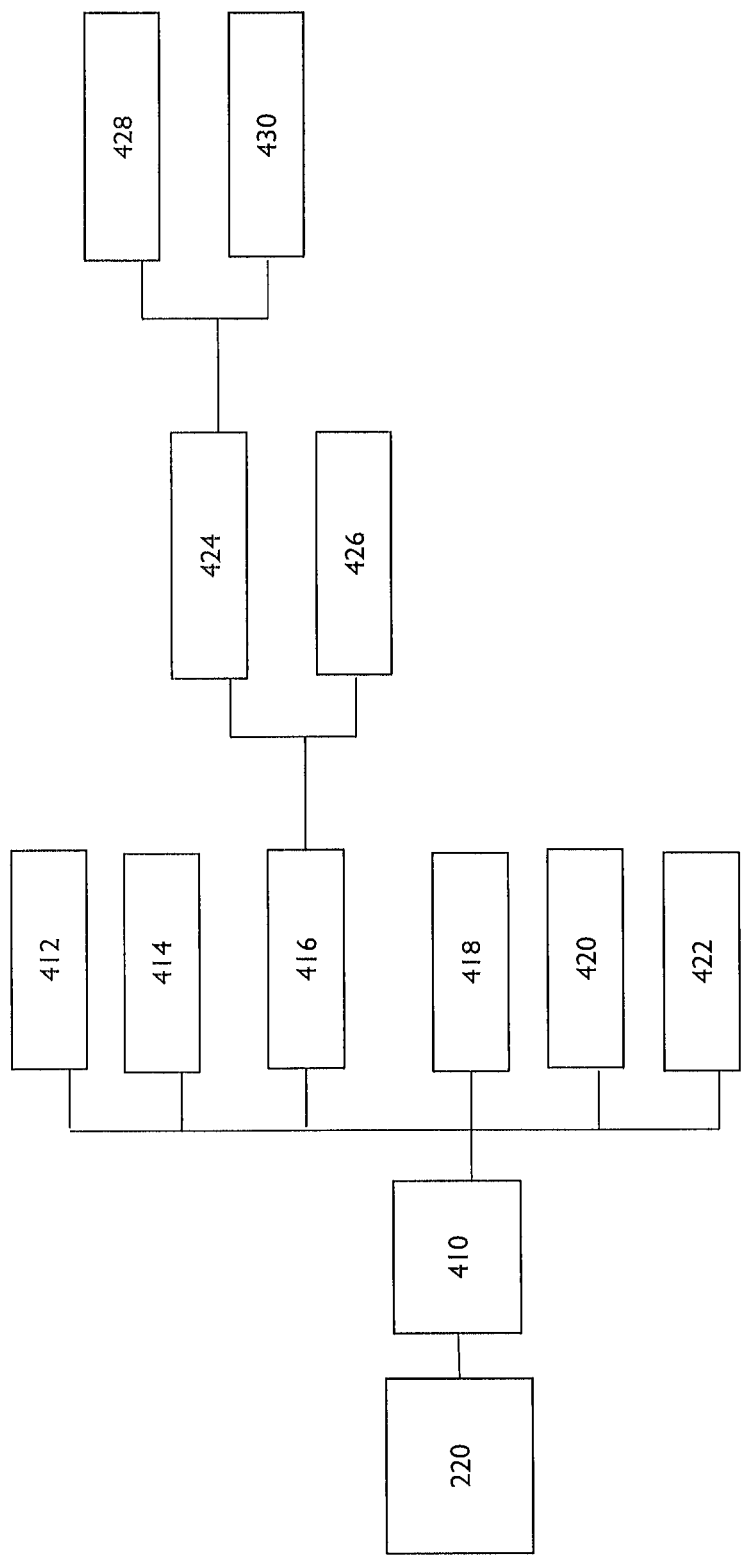
FIG. 4 shows an flow chart for an illustrative process definition, according to an embodiment.

FIG. 4 shows a flowchart showing components of the process definition stage 220, after the material information is already entered in stage 210. For each device layer 410, the process sequence may have one or more of the following process steps: deposition of a material (block 412), photoresist coating (block 422), patterning the layer (block 416), etching unwanted material (block 418), stripping photoresist (block 420), and planarizing the layer (block 422) using a process like chemical-mechanical-polishing or other processes. These are typical process steps in semiconductor manufacturing, and the number of steps used and/or the sequence of the steps will depend on the requirement of a particular device structure. For example, after planarization of one layer, an additional coating step may be introduced for protection of the current layer when the next layer is processed. The patterning step may be done using variants of lithography models (block 424), and/or using actual patterns from a product design layout (block 426). In the flowchart in FIG. 4, model type I and model type II are shown to illustrate that model variations can be accommodated. For example, model type I (block 428) may be Tachyon model, and model type II (block 430) may be a geometry-based model.

The processes that can be supported by the D4C method include, but are not limited to: dual damascene, litho-etch-litho-etch (LELE), double patterning and multiple spacer patterning etc. D4C can take into account many process variations and perturbations of process parameters.

Using the D4C program, a designer can assign a respective sequence of process steps in the overall model of the lithography process for each device layer. Each process step may be assigned respective process step indicia. Each designed metrology target may be tagged with the process step indicia to facilitate retrieval of particular designs from a metrology target database containing the plurality of designed metrology targets. Examples of individual process steps are: deposition, photoresist coating, patterning, etching, stripping, planarization, etc., as shown in FIG. 4.

FIG. 5 shows a screenshot 500 of a process definition window, showing the model parameters. The model parameters are based on information about the materials to be used and the individual process steps. This information is entered by the designer in a table via an appropriate graphic user interface (GUI) of the D4C software.

Figure 6:
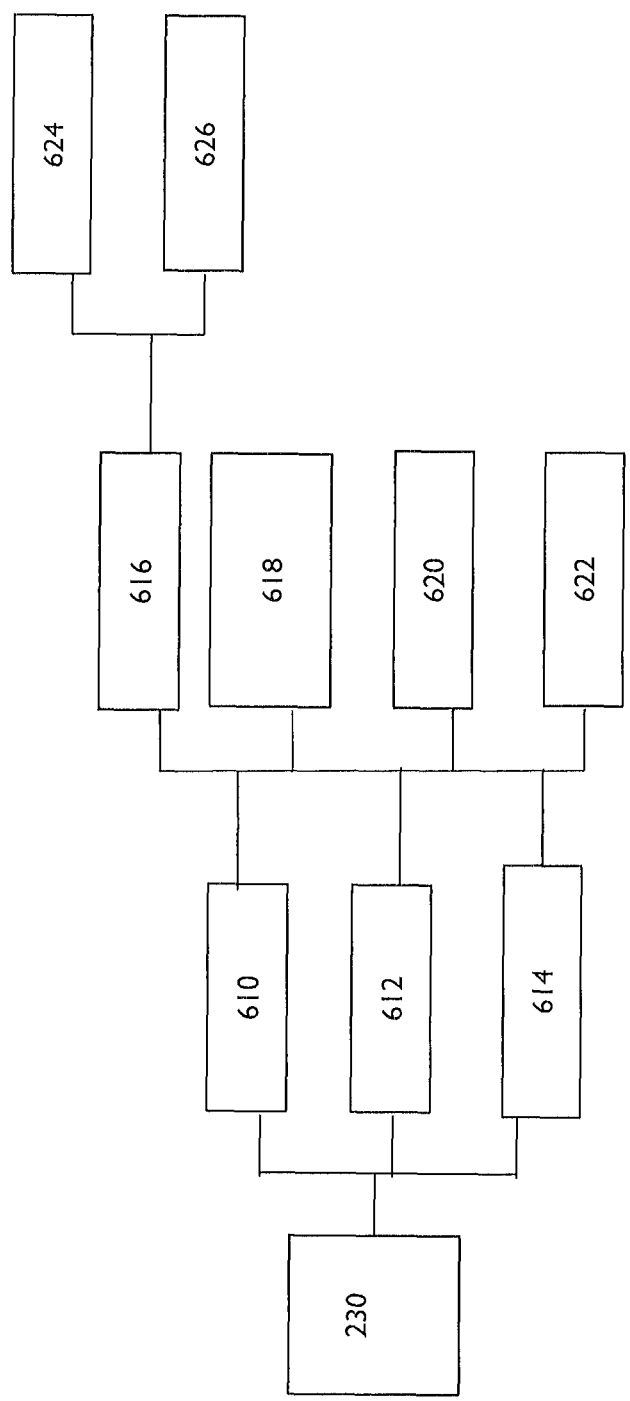
FIG. 6 shows a flow chart showing components of target definition, according to an embodiment.

FIG. 6 shows a flowchart showing components of the target definition stage 230, after following the stages 210 and 220. The target can be defined by X-(block 610) and Y-orientations (block 612) of target features as they are to be laid out on a substrate being processed. The target can be measured at a certain process step ("inspection point") (block 614). Examples are after develop or after etch. For each orientation, multiple characteristic input regarding the target can be added, including, but not limited to the following: whether the target feature in one layer (block 624) has an overlay (block 616) with respect to another feature in another layer (block 626); whether the target feature belongs to a special type of structure (e.g., a grating) (block 618); whether the target feature needs to be open (block 620) or protected (block 622) after resist patterning, etc.

Figure 7:
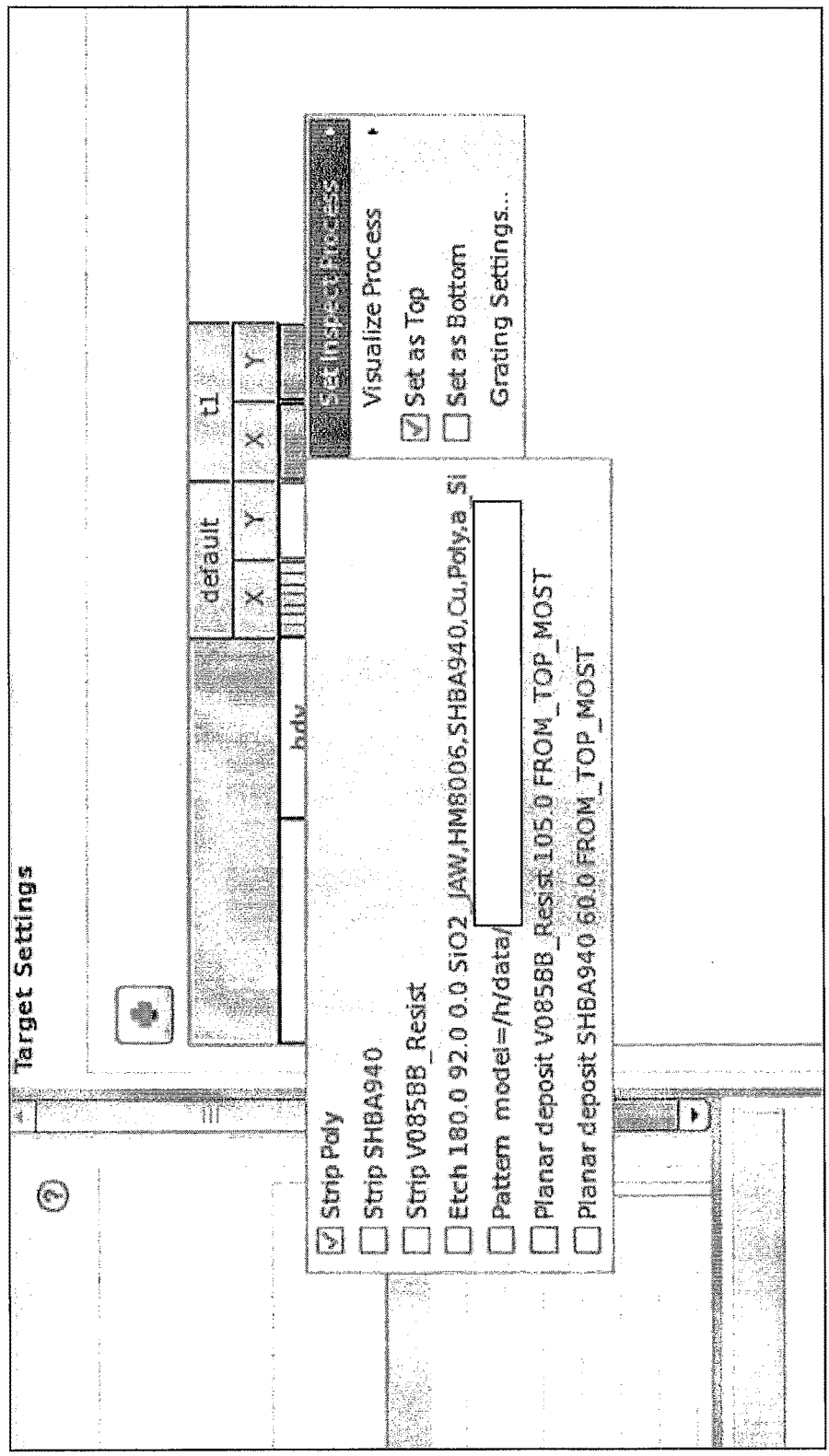
FIG. 7 shows an illustrative graphic user interface for target definition, according to an embodiment.

FIG. 7 shows a GUI from the target definition stage, where the target definition is tied to the process steps and parameters that have already been entered as input. The process may be based on a customer's work flow. Target definition can be done for multiple possible device layers and multiple inspection points. Data can be inserted in a separate table for each layer, or unified in a central table.

Figure 8:
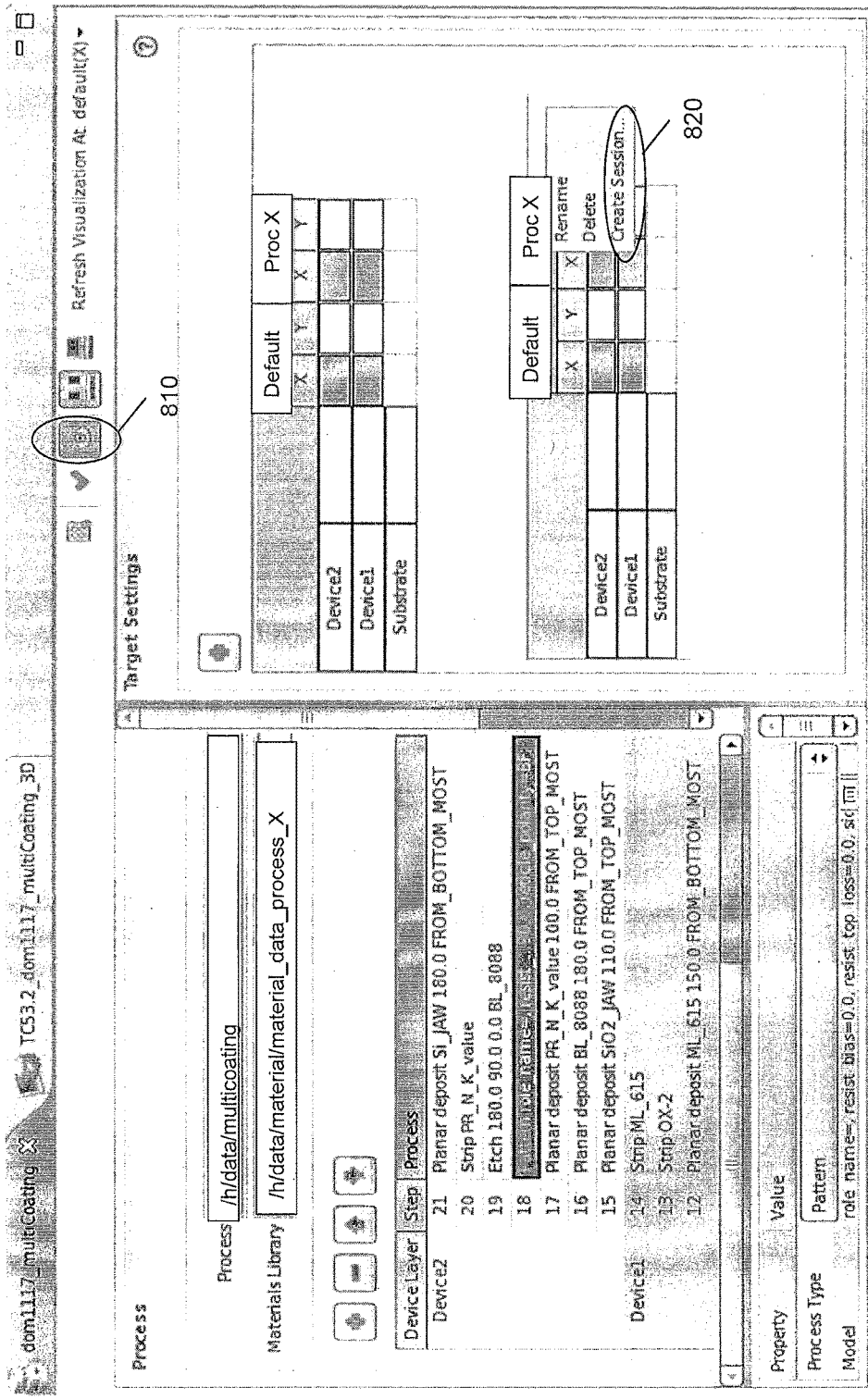
FIG. 8 shows an illustrative graphic user interface for process and target definition, according to an embodiment.

FIG. 8 shows a screenshot 800 in another embodiment where process and target definition are viewed together for various device layers. The device layers are indicated as "Device1," "Device2" etc. The icon 810 on the top of the screen can be clicked for choosing different visualization options. The "create session" command 820 is used to go to the next stage of the D4C process, which is overlay target simulation session 900, shown in FIG. 9. A target on substrate may be a grating which is printed such that after development, the grating bars are formed of solid resist lines. The bars may alternatively be etched into the substrate. The target pattern may be chosen to be sensitive to a parameter of interest, such as focus, dose, overlay, chromatic aberration in the lithographic projection apparatus, etc., such that variation in the relevant parameter will manifest as variation in the printed target. If two grating components are overlying, then the overlaying components are arranged so that if they were both printed exactly at their nominal locations, one of the components would be offset relative to the other by a defined distance.

The metrology targets as described herein may be, for example, overlay targets designed for use with a metrology tool such as Yieldstar stand-alone or integrated metrology tool, and/or alignment targets such as those typically used with a TwinScan lithographic system, both available from ASML.

Figure 9:
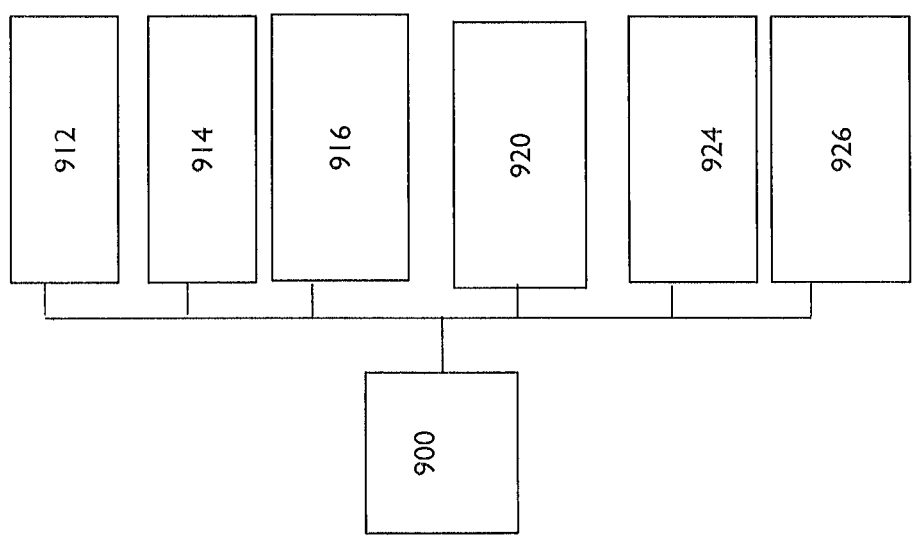
FIG. 9 shows a flow chart showing components of an overlay session, according to an embodiment.

FIG. 9 shows a flowchart showing components of the overlay session. This session is important for proper alignment of features from different layers with respect to each other in a multi-layer semiconductor device. This session has the information about the target type 912 and pattern definition 914. Pattern definition may include information about the type of pattern, any process constraints to be aware of, and design rules, if any. Patterns are generated in step 916. In step 920, the 3D geometry is created. Metrology tool settings 924 are also entered as input as design parameter. The settings may include source illumination design terms (such as broadband source wavelength, polarization, aperture etc.) The optical components are modeled using source file formats, such as, CDC or spf, that are compatible with the D4C software package. Once all the inputs are inserted, overlay is simulated in 926. A 2D simulation model or 3D simulation model for overlay can be used.

Figures 10A, 10B:
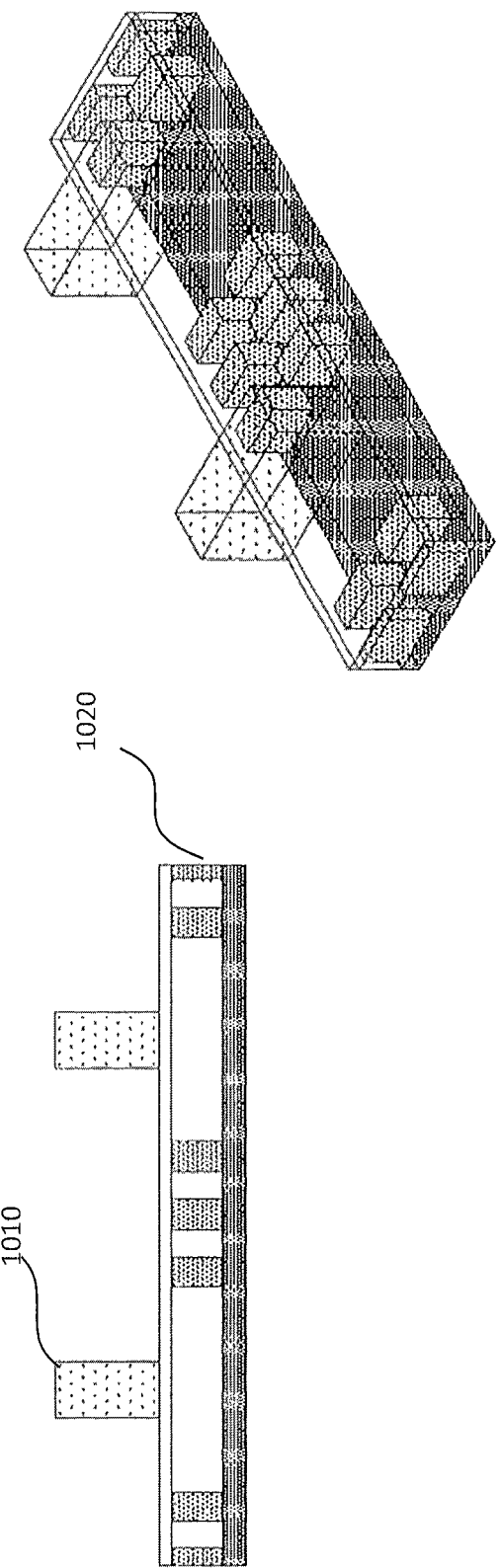
FIG. 10A-10B show two views of an illustrative rendered structure from a process definition, according to an embodiment.

FIGS. 10A and 10B respectively show a front view and a 3D isometric view of an illustrative rendered structure, showing multiple layers of processed materials. The structure is rendered using a lithography process model provided to the D4C package. Specifically, the etched columns 1010 on the top layer and the columns 1020 in the intermediate layer are aligned with respect to each other, as controlled by the information used in the overlay session.

Figure 11:
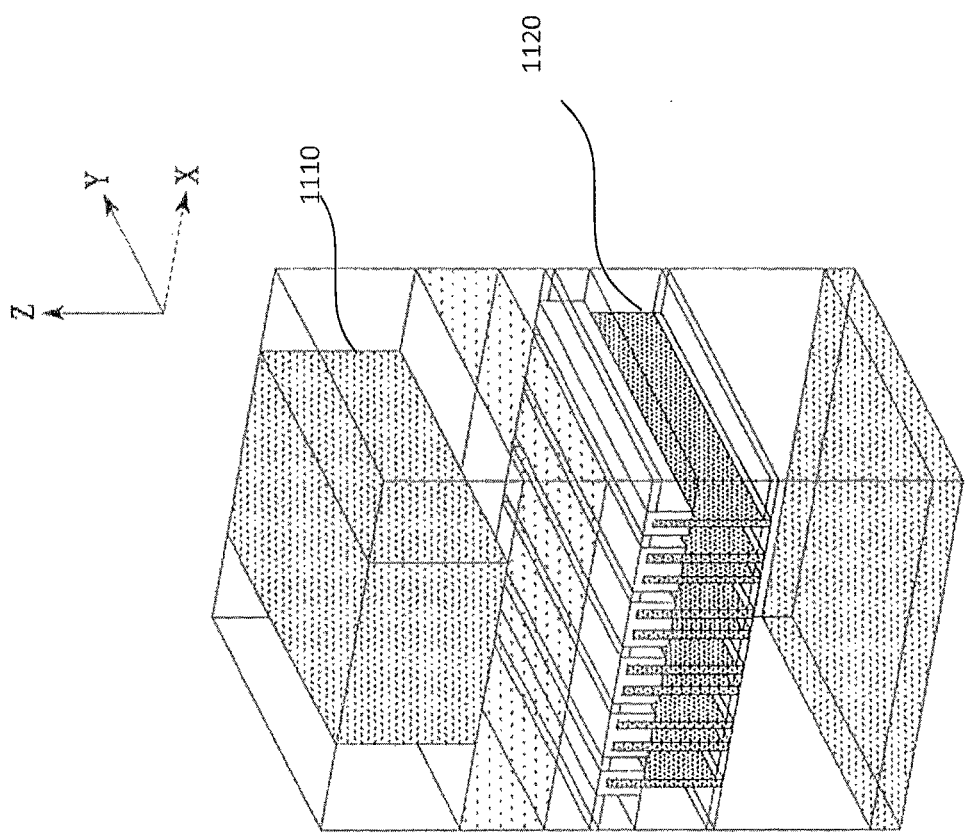
FIG. 11 shows an illustrative multi-layer target structure rendered by the method and system of an embodiment of the present disclosure.

FIG. 11 shows a more complex device structure, such as a FinFET array, which requires several layers of materials and several steps of processing. Overlay control is particularly important for device structures involving multiple layers, and D4C method is fully capable of handling the multi-layer configuration. In the device shown in FIG. 11, a top electrode layer 1110 is aligned with respect to the array of fins 1120 in a layer which is not necessarily adjacent to the top electrode layer. However, D4C allows users to define spatial and other characteristic relationship between features from different layers.

As mentioned above, real-time visualization is an important feature of D4C method. Various capabilities of visualization (such as, coloring, rotating, slicing, making a layer transparent, zooming, etc.) are provided for facilitating the design process and/or enhancing the designer's or a user's comprehension. The visualization capability is a particularly powerful feature in the context of multilayer devices.

The metrology targets may comprise a multi-layer configuration corresponding to the multiple device layers of the semiconductor device. One or more of the design parameters used for generating the plurality of metrology targets may comprise a parameter indicating overlay between two device layers of the semiconductor device. Additionally, a relationship between two distinct features of a metrology target may be provided as a design parameter, such that if one of the distinct features is altered, the other is also automatically altered. The two distinct features may belong to two different device layers, but their relationship is tracked by the D4C method, so that no manual intervention is required to ensure related features are simultaneously changed. Dimensions of the features of the plurality of the metrology targets vary during individual process steps reflecting process-induced effects on post-processed substrate structure. Real-time visualization helps the designer perceive these changes effectively.

Figure 12:
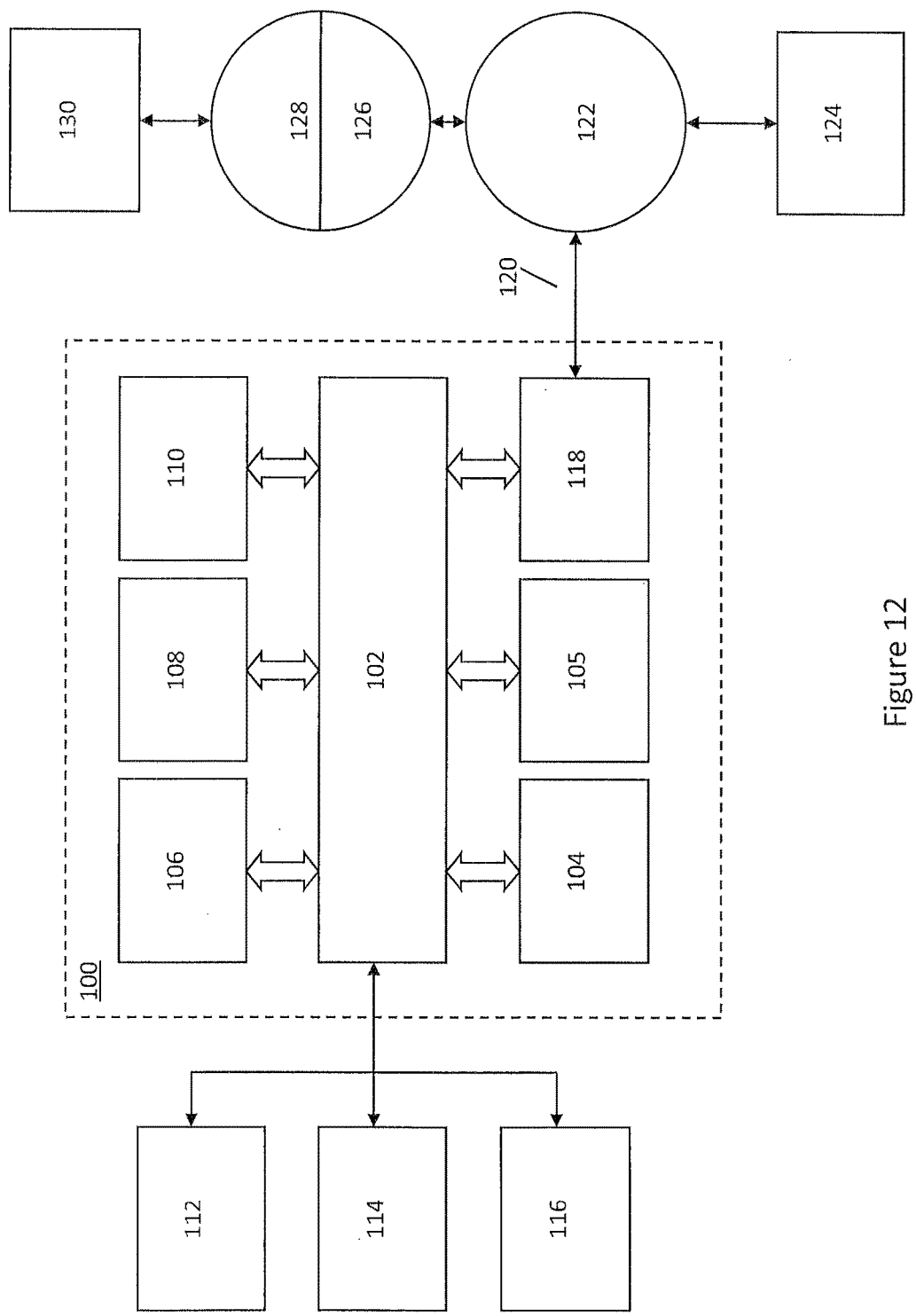
FIG. 12 is a block diagram of an example computer system in which embodiments of the present disclosure can be implemented; and, FIG. 13 schematically depicts an embodiment of a lithographic apparatus.

FIG. 12 is a block diagram that illustrates a computer system 100 which can assist in implementing the methods and flows disclosed herein. Computer system 100 includes a bus 102 or other communication mechanism for communicating information, and a processor 104 (or multiple processors 104 and 105) coupled with bus 102 for processing information. One or more of the processors may be special graphic processing unit (GPU) for executing D4C's visual rendering software components along with associated hardware.

Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device. Display 112 helps visualization of D4C during metrology target design. An example of what is displayed to a designer is shown in FIG. 3. The designer has control of what he/she wants to be displayed on a screen.

According to one embodiment, portions of the process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with one or more embodiments, one such downloaded application provides for the graphic viewing optimization of the embodiment, for example. The received code may be executed by processor 104 as it is received, and/or stored in storage device 110, or other non-volatile storage for later execution.

Figure 13:
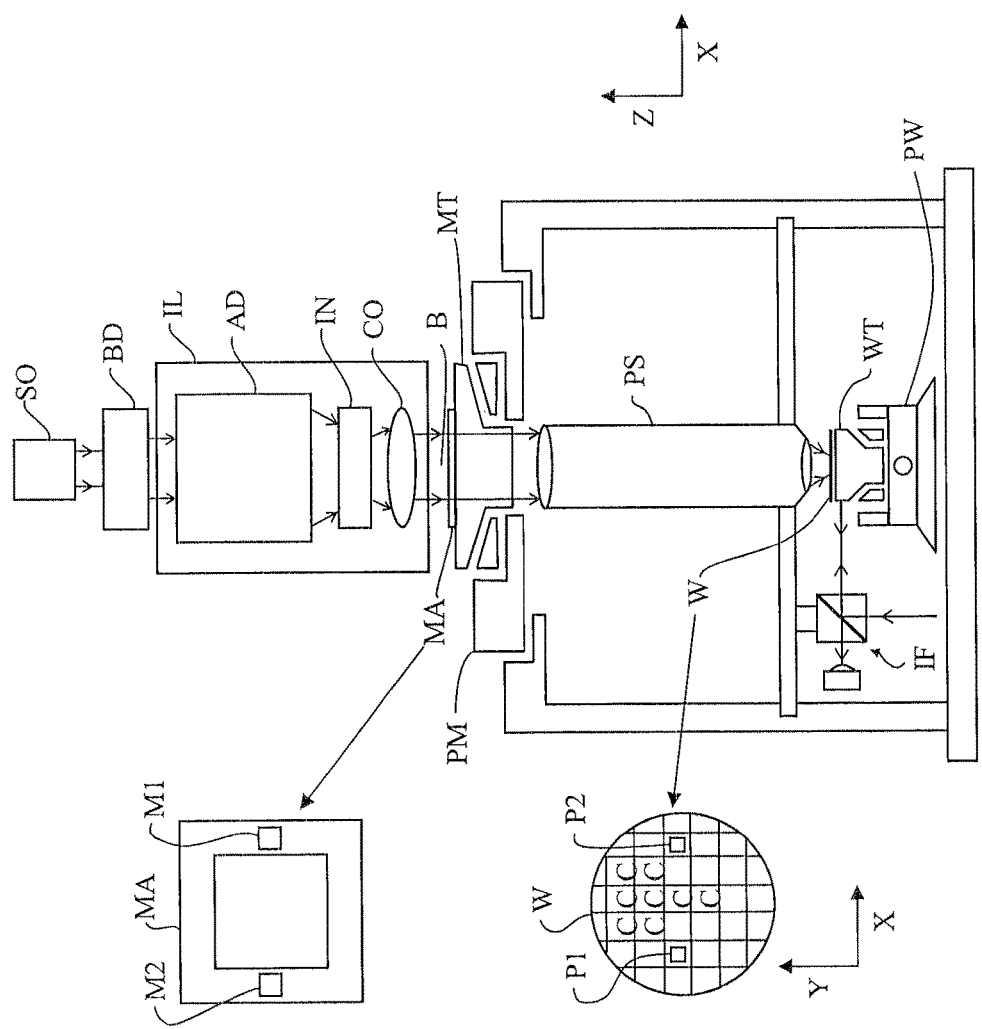

FIG. 13 schematically depicts a lithographic projection apparatus that may be used to manufacture semiconductor devices, including multi-layer complex devices, such as a FinFET device shown in FIG. 11. The methods and systems of the present disclosure facilitate simulating and viewing the device structure optimized for an actual lithography process to be carried out using an actual lithographic apparatus, such as the one shown in FIG. 13. However, persons skilled in the art would recognize that simulation tool can accommodate various lithographic apparatuses and lithography processes.

The apparatus shown in FIG. 13 comprises:

a radiation system or illumination system IL, for supplying a projection beam B of radiation. In this particular case, the radiation system also comprises a radiation source SO;

a first object table (mask table) MT provided with a mask holder for holding a mask MA (e.g., a reticle), and connected to first positioning means PM for accurately positioning the mask with respect to projection system PS;

a second object table (substrate table) WT provided with a substrate holder for holding a substrate W (e.g., a resist-coated silicon wafer), and connected to second positioning means PW for accurately positioning the substrate with respect to projection system PS; and, a projection system ("lens") PS (e.g., a refractive, catoptric or catadioptric optical system) for imaging an irradiated portion of the mask MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning means as an alternative to the use of a mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander or beam delivery system BD, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the mask MA has a desired uniformity and intensity distribution in its cross-section.

It should be noted with regard to FIG. 13 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing). The current disclosure encompasses at least both of these scenarios.

The beam B subsequently intercepts the mask MA, which is held on a mask table MT. Having traversed the mask MA, the beam B passes through the lens PS, which focuses the beam PS onto a target portion C of the substrate W. With the aid of the second positioning means (and interferometric measuring means IF), the substrate table WT can be moved accurately, e.g. so as to position different target portions C in the path of the beam B. Similarly, the first positioning means can be used to accurately position the mask MA with respect to the path of the beam B, e.g., after mechanical retrieval of the mask MA from a mask library, or during a scan. In general, movement of the object tables MT, WT will be realized with the aid of a long-stroke module (coarse positioning) and a short-stroke module (fine positioning), which are not explicitly depicted in FIG. 13. However, in the case of a wafer stepper (as opposed to a step-and-scan tool) the mask table MT may just be connected to a short stroke actuator, or may be fixed.

Patterning device MA and substrate W may be aligned using alignment marks Ml, M2 in the patterning device, and alignment marks P1, P2 on the substrate, as required.

The depicted tool can be used in two different modes:

In step mode, the mask table MT is kept essentially stationary, and an entire mask image is projected in one go (i.e., a single "flash") onto a target portion C. The substrate table WT is then shifted in the x and/or y directions so that a different target portion C can be irradiated by the beam B; and, In scan mode, essentially the same scenario applies, except that a given target portion C is not exposed in a single "flash". Instead, the mask table MT is movable in a given direction (the so-called "scan direction", e.g., the y direction) with a speed v, so that the projection beam B is caused to scan over a mask image; concurrently, the substrate table WT is simultaneously moved in the same or opposite direction at a speed V=Mv, in which M is the magnification of the lens PS (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include DUV (deep ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range. Because most materials are absorptive within this range, illumination may be produced by reflective mirrors with a multi-stack of Molybdenum and Silicon. The multi-stack mirror has 40 layer pairs of Molybdenum and Silicon where the thickness of each layer is a quarter wavelength. Even smaller wavelengths may be produced with X-ray lithography. Typically, a synchrotron is used to produce an X-ray wavelength. Since most material is absorptive at x-ray wavelengths, a thin piece of absorbing material defines where features would print (positive resist) or not print (negative resist).

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Embodiments may further be described using the following clauses:

1. A computer-implemented method of designing metrology targets in a simulation domain, the metrology targets compatible to a lithography process used to fabricate a semiconductor device, the method comprising:
   providing design parameters for generating a metrology target;
   designing a three-dimensional geometrical structure of the metrology target based on a model of the lithography process and the design parameters for the metrology target, wherein the model of the lithography process comprises a sequence of process steps; and
   visually rendering a gradual formation of the three-dimensional geometric structure of the metrology target at a substrate level in the simulation domain.
2. The method of clause 1, wherein the design of metrology targets is automated.

3. The method of clause 2, wherein a plurality of metrology targets is designed automatically.
4. The method of clause 3, wherein the method further comprises:
  perturbing one or more parameters of a process step within the sequence of process steps;
  applying the perturbed process step to the designed plurality of metrology targets;
  selecting a subset of metrology targets from the designed plurality of metrology targets for which the change in the three-dimensional geometric structure is minimal when the perturbed process step is applied.
5. The method of clause 3, wherein the semiconductor device comprises multiple device layers.
6. The method of clause 5, wherein each device layer corresponds to a respective sequence of process steps in the overall model of the lithography process.
7. The method of clause 5, wherein the plurality of metrology targets comprise a multi-layer configuration corresponding to at least some of the multiple device layers of the semiconductor device.
8. The method of clause 7, wherein at least one of the design parameters used for generating the plurality of metrology targets comprises a parameter indicating overlay between two device layers of the semiconductor device.
9. The method of clause 7, wherein a relationship between two distinct features of a metrology target is provided as a design parameter, such that if one of the distinct features is altered, the other is also automatically altered.
10. The method of clause 9, wherein the two distinct features belong to two different device layers.
11. The method of clause 3, wherein each process step is assigned respective process step indicia.
12. The method of clause 11, wherein each designed metrology target is tagged with the process step indicia to facilitate retrieval of particular designs from a metrology target database containing the plurality of designed metrology targets.
13. The method of clause 1, wherein individual process steps include one or more of:
  deposition, photoresist coating, patterning, etching, stripping, and, planarization.
14. The method of clause 1, wherein feature dimensions of the plurality of the metrology targets vary during individual process steps reflecting process-induced effects on post-processed substrate structure.
15. The method of clause 1, wherein materials used for individual process steps are selected from a material library.
16. The method of clause 15, wherein the model for the lithography process provides run time estimation of the simulation process once the materials, the individual process steps, and the design parameters of the metrology targets are provided.
17. The method of clause 1, wherein the method further comprises: through a viewing editor, providing a user various tools for visualization, the tools including one or more of: coloring, shading, rotating, slicing, making device layers transparent, zooming in, and, zooming out.
18. A computer program product comprising a non-transitory computer readable medium having instructions recorded thereon, the instructions when executed by a computer implementing the method of any of the above clauses.

Aspects of the disclosure can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the disclosure may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

What is claimed is:
1. A method comprising:
  obtaining design parameters for generating a plurality of metrology targets, each metrology target being of different design and designed for use with a lithography process used to fabricate a physical device on a substrate;
  designing, by a hardware computer system, a three-dimensional geometrical structure of the metrology targets based on a model of the lithography process and the design parameters for the metrology targets, wherein the model of the lithography process represents a sequence of process steps;
  perturbing a parameter of a process step within the sequence of process steps;
  applying the process step with the perturbed parameter to the designed plurality of metrology targets;
  selecting a subset of metrology targets from the designed plurality of metrology targets based on the application of the process step with the perturbed parameter;
  performing a computer simulation, by the computer system, of at least one metrology target of the subset of metrology targets; and
  generating electronic data to enable fabrication of at least one metrology target of the subset of metrology targets for use with the lithography process, where the electronic data, or information derived therefrom, is configured to regulate fabrication of the at least one metrology target of the subset of metrology targets on a substrate.
2. The method of claim 1, further comprising visually rendering, on a display connected to the computer system, a gradual formation of the three-dimensional geometric structure of the at least one metrology target at substrate level based on results from the computer simulation.
3. The method of claim 2, further comprising, through a viewing editor, providing a user various tools for visualization, the tools including one or more selected from: coloring, shading, rotating, slicing, making device layers transparent, zooming in, and/or zooming out.
4. The method of claim 1, further comprising selecting the subset of metrology targets from the designed plurality of metrology targets for which the change in the three-dimensional geometric structure is minimal when the process step with the perturbed parameter is applied.
5. The method of claim 1, wherein a relationship between two distinct features of a metrology target is provided as a design parameter, such that if one of the distinct features is altered, the other is also automatically altered.
6. The method of claim 5, wherein the two distinct features belong to two different layers of the device.
7. The method of claim 1, wherein the model for the lithography process provides a run time estimation of the simulation process once the materials, the individual process steps, and the design parameters of the metrology targets are provided.

8. A computer program product comprising a non-transitory computer readable medium having instructions recorded thereon, the instructions when executed by a computer system are configured to cause the computer system at least to:

obtain design parameters for generating a plurality of metrology targets, each metrology target being of different design and designed for use with a lithography process used to fabricate a physical device on a substrate;

design a three-dimensional geometrical structure of the metrology targets based on a model of the lithography process and the design parameters for the metrology targets, wherein the model of the lithography process represents a sequence of process steps;

perturb a parameter of a process step within the sequence of process steps;

apply the process step with the perturbed parameter to the designed plurality of metrology targets;

select a subset of metrology targets from the designed plurality of metrology targets based on the application of the process step with the perturbed parameter;

perform a computer simulation of at least one metrology target of the subset of metrology targets; and generate electronic data to enable fabrication of at least one metrology target of the subset of metrology targets for use with the lithography process, where the electronic data, or information derived therefrom, is configured to regulate fabrication of the at least one metrology target of the subset of metrology targets on a substrate.

9. The computer program product of claim 8, wherein the instructions are further configured to cause the computer system to visually render, on a display, a gradual formation of the three-dimensional geometric structure of the at least one metrology target at substrate level based on results from the computer simulation.

10. The computer program product of claim 8, wherein the instructions are further configured to cause the computer system to provide a user, through a viewing editor, various tools for visualization, the tools including one or more selected from: coloring, shading, rotating, slicing, making device layers transparent, zooming in, and/or zooming out.

11. The computer program product of claim 8, wherein the plurality of metrology targets is designed automatically.

12. The computer program product of claim 8, wherein the instructions are further configured to cause the computer system to select the subset of metrology targets from the designed plurality of metrology targets for which the change in the three-dimensional geometric structure is minimal when the process step with the perturbed parameter is applied.

13. The computer program product of claim 8, wherein the device comprises multiple device layers and the metrology target is designed to have a structure in at least one layer of the device.

14. The computer program product of claim 13, wherein each device layer corresponds to a respective sequence of process steps represented in the model of the lithography process.

15. The computer program product of claim 13, wherein each of the metrology targets comprises a multi-layer configuration corresponding to at least some of the multiple device layers of the device.

16. The computer program product of claim 15, wherein at least one of the design parameters used to generate the metrology targets comprises a parameter indicating overlay between two device layers of the device.

17. The computer program product of claim 13, wherein a relationship between two distinct features of a metrology target is provided as a design parameter, such that if one of the distinct features is altered, the other is also automatically altered.

18. The computer program product of claim 17, wherein the two distinct features belong to two different device layers.

19. The computer program product of claim 8, wherein each process step is assigned respective process step indicia and each designed metrology target is tagged with the process step indicia to facilitate retrieval of particular designs from a metrology target database containing a plurality of designed metrology targets.

20. The computer program product of claim 8, wherein the process steps include one or more selected from: deposition, photoresist coating, patterning, etching, stripping, and/or planarization.

21. The computer program product of claim 8, wherein feature dimensions of the metrology target vary during one or more of the process steps reflecting process-induced effects on a post-processed substrate structure.

22. The computer program product of claim 8, wherein materials used for one or more of the process steps are selected from a material library.

23. The computer program product of claim 22, wherein the instructions are further configured to cause the computer system to provide a run time estimation, based on the model, of the simulation process once the materials, the process steps, and the design parameters of the metrology targets are provided.

* * * * *